United States Patent [19]

Harris

[11] Patent Number: 4,779,755

[45] Date of Patent: Oct. 25, 1988

[54] PRESSURE RELEASE CONTROL FUEL CAP

[75] Inventor: Robert S. Harris, Connersville, Ind.

[73] Assignee: Stant Inc., Connersville, Ind.

[21] Appl. No.: 135,222

[22] Filed: Dec. 21, 1987

Related U.S. Application Data

[63] Continuation-in-part of Ser. No. 42,791, Apr. 27, 1987, abandoned, which is a continuation-in-part of Ser. No. 888,575, Jul. 22, 1986, Pat. No. 4,676,390.

[51] Int. Cl.$^4$ .................................................. B65D 51/16
[52] U.S. Cl. ................................. 220/203; 220/303; 220/DIG. 33
[58] Field of Search ............... 220/203, 208, 209, 206, 220/288, 303, 304, DIG. 32, DIG. 33; 137/493.9, 315, 493, 39, 43

[56] References Cited

U.S. PATENT DOCUMENTS

| | | |
|---|---|---|
| 2,006,752 | 7/1935 | Swank . |
| 2,591,562 | 4/1952 | Levell . |
| 2,792,964 | 5/1957 | Reese et al. . |
| 2,865,531 | 12/1958 | Gorst et al. . |
| 2,964,214 | 12/1960 | Stannard . |
| 2,990,971 | 7/1961 | Enell . |
| 3,082,905 | 3/1963 | Friend . |
| 3,098,636 | 7/1963 | Contella ........................ 251/98 |
| 3,111,239 | 11/1963 | Ivins . |
| 3,112,840 | 12/1963 | Miller et al. . |
| 3,147,881 | 9/1964 | Friend . |
| 3,163,315 | 12/1964 | Wilson . |
| 3,186,580 | 6/1965 | Previte . |
| 3,203,445 | 8/1965 | McCormick ................. 137/493.4 |
| 3,373,894 | 3/1968 | Johnson . |
| 3,434,621 | 3/1969 | Previte . |
| 3,587,912 | 6/1971 | Ohta et al. . |
| 3,616,960 | 11/1971 | Miller et al. . |
| 3,703,245 | 11/1972 | Brewer . |
| 3,854,911 | 12/1974 | Walker ................................. 55/387 |
| 4,036,399 | 7/1977 | Gerdes ............................... 220/303 |
| 4,177,931 | 12/1979 | Evans ................................ 220/288 |
| 4,228,915 | 10/1980 | Hooper et al. .................... 220/288 |
| 4,245,751 | 1/1981 | Neiman ............................. 220/204 |
| 4,271,976 | 6/1981 | Detwiler ............................ 220/206 |
| 4,337,873 | 7/1982 | Johnson ............................ 220/204 |
| 4,458,823 | 7/1984 | Baker ................................ 220/203 |
| 4,458,824 | 7/1984 | Baker et al. ...................... 220/203 |
| 4,494,673 | 1/1985 | Hiraishi ............................ 220/288 |
| 4,498,493 | 2/1985 | Harris ............................... 137/469 |
| 4,572,396 | 2/1986 | Kasugai et al. .................. 220/203 |
| 4,579,244 | 4/1986 | Fukuta .............................. 220/210 |
| 4,588,102 | 5/1986 | Kasugai ............................ 220/203 |
| 4,676,390 | 6/1987 | Harris ............................... 220/203 |
| 4,716,920 | 1/1988 | Crute ................................ 220/203 |
| 4,726,488 | 2/1988 | Kasugai ............................ 220/203 |

Primary Examiner—George T. Hall
Attorney, Agent, or Firm—Barnes & Thornburg

[57] ABSTRACT

A fuel cap is provided with a vent system for lowering the actuation pressure of its internal pressure-relief valve in response to rotation of the fuel cap relative to the filler neck in a cap-removal direction. The vent system provides an operative connection between the cap handle and a pressure-relief valve in the cap. The vent system includes a spring for applying a closure-inducing force urging the pressure-relief valve against its valve seat to close a vent aperture in the cap, and a control system for regulating the magnitude of the closure-inducing force in response to rotation of the handle in a cap-removal direction. Use of the control system to lower the magnitude of the closure-inducing force permits the pressure-relief valve to move away from the valve seat to a venting position upon exposure to excessive fuel vapor pressure in the filler neck so that a fuel vapor-venting outlet through the cap is established during a removal of the fuel cap from the filler neck. This vent system facilitates venting of the tank past the pressure-relief valve in a controlled manner past the pressure-relief valve prior to breaking a primary fuel and fuel vapor seal between the fuel cap and the filler neck.

17 Claims, 2 Drawing Sheets

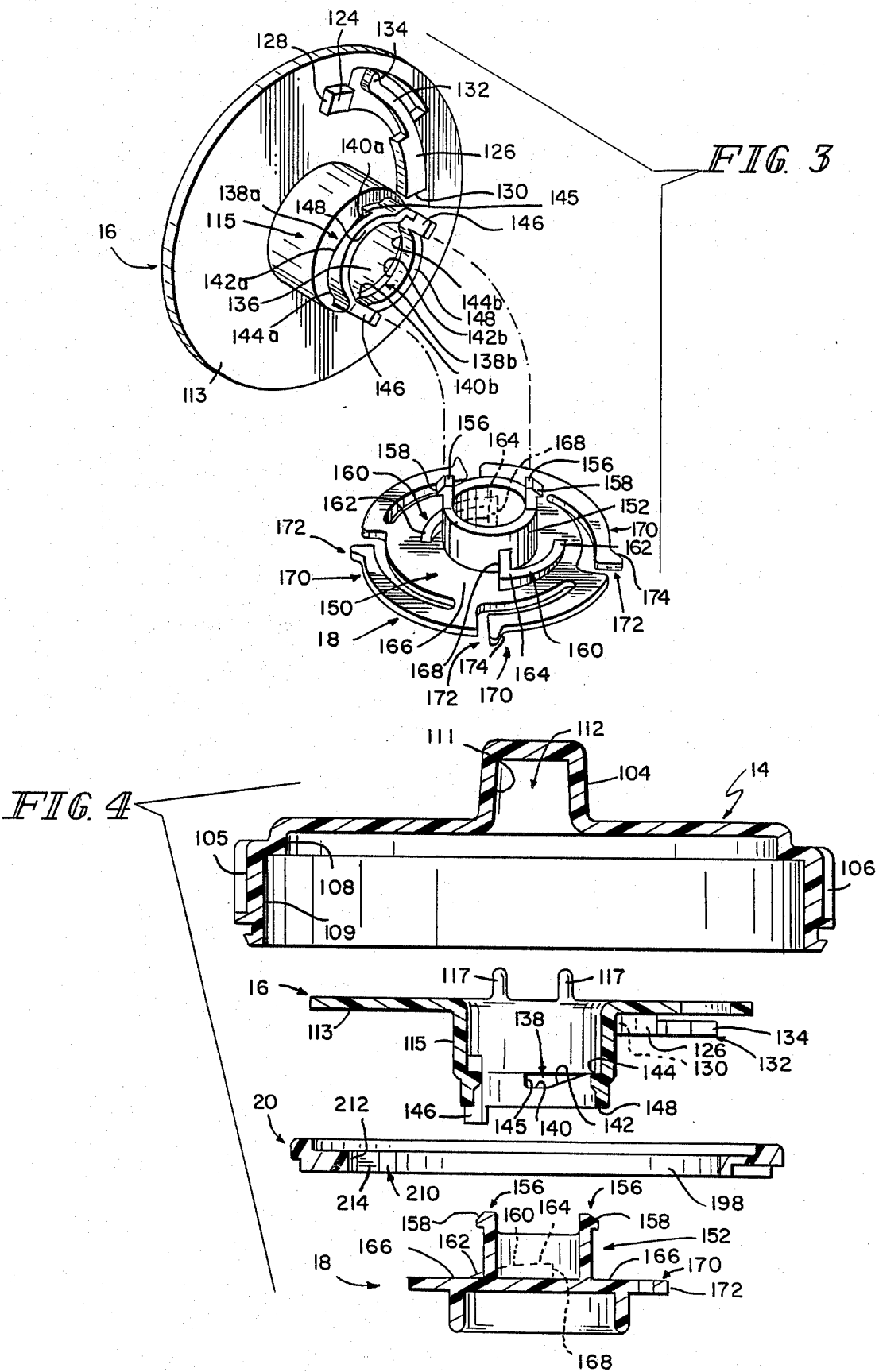

PRESSURE RELEASE CONTROL FUEL CAP

BACKGROUND AND SUMMARY OF THE INVENTION

This is a continuation-in-part of co-pending U.S. patent application Ser. No. 07/042,791, filed Apr. 27, 1987, now abandoned, which is a continuation-in-part of U.S. patent application Ser. No. 06/888,575, filed July 22, 1986, now U.S. Pat. No. 4,676,390, granted June 30, 1987.

The present invention relates to fuel caps for closing filler necks of vehicle fuel tanks, and particularly to a fuel cap having a controlled release fuel vapor venting system that enables fuel vapor to be vented from the tank in a controlled manner during removal of the fuel cap from the filler neck. More particularly, the present invention relates to a fuel cap having a system for lowering the actuation pressure of its internal pressure-relief valve in response to rotation of the fuel cap relative to the filler neck in a cap-removal direction. This system facilitates venting of the tank past the pressure-relief valve in a controlled manner past the pressure-relief valve prior to breaking a primary fuel and fuel vapor seal between the fuel cap and the filler neck.

Conventional fuel caps for closing the filler neck of vehicle fuel tanks generally include a pressure-vacuum valve located in the cap to control the pressure within the fuel tank. Whenever the pressure within the tank reaches a predetermined superatmospheric level, the pressure-relief valve portion of the pressure-vacuum valve automatically opens to prevent excess pressure build-up. Whenever the pressure within the tank drops to a predetermined subatmospheric level, the vacuum-relief valve portion of the pressure-vacuum valve opens to equalize the pressure in the tank.

The pressure-vacuum valve in a conventional fuel cap must be adjusted so that the potential for some vapor pressure to remain in the fuel tank exists at all times. Generally, the pressure maintained within the fuel tank is in the range of 1-2 psi. This retention of some level of fuel vapor in the tank is desired for several reasons, and normally does not create any problems. However, under certain conditions, pressure from fuel vapor can result in fuel and fuel vapor escaping from the filler neck once the fuel cap is removed. This rapid escape, or surge, of the fuel and fuel vapor from the filler neck after cap removal ran result in emission of a potentially dangerous fuel vapor concentration level in the region surrounding the filler neck, as well as the possibility that the person removing the cap could be injured by hot fuel spray.

With larger fuel tanks now being utilized in many vehicles, and particularly with the use of newer, more volatile blends of fuel having higher than normal Reid vapor pressure, more than normal fuel vapor pressure may be generated in these fuel tanks, particularly in warm or hot weather or after the vehicle has been running. Therefore, it would be advantageous to provide a fuel cap that will enable fuel vapor to be vented from the fuel tank sometime during the cap-removal operation, but before the cap is actually removed from the filler neck. Ideally, when the cap is used in the manner described hereinafter, this venting will be a controlled, metered venting of the fuel vapor with the fuel vapor being directed away from the operator.

Threaded caps that engage threads in the filler neck of vehicles are now widely used because of their ease of installation and removal, and because of their excellent sealing characteristics. Therefore, it would be advantageous to provide a fuel cap that will enable the fuel tank to be vented in a controlled manner upon rotation of the cap in the cap-removal direction to allow the fuel vapor to be vented before the cap is removed.

Most conventional threaded fuel caps include a primary seal that is adapted to engage a sealing lip on the filler neck when the cap is rotated fully in the cap-installation direction. These conventional threaded fuel caps generally have an outer cover that is configured to be gripped by the operator to rotate the cap. Because unseating of the primary seal can result in a surge of fuel and fuel vapor from the filler neck in warm or hot weather, or after the vehicle has been running, it would also be advantageous to provide a fuel cap that enables fuel vapor to be vented from the tank in a controlled manner upon rotation of the outer cover before the seal between the primary seal and the filler neck is broken.

Conventional pressure-relief valves in fuel caps are disclosed, for example, in U.S. Pat. Nos. 4,091,955 and 4,498,493. These pressure-relief valves typically are movable between a filler neck-venting and a filler neck-closing position and include a spring oonfigured to bias the valve normally against its valve seat to the filler neck-closing position.

In use, fuel vapor in the filler neck having a pressure in excess of a predetermined threshold pressure acts over an exposed area of the pressure-relief valve to move the valve away from its filler neck-closing position. The size, coefficient, and character of the spring cooperate to determine the closing force applied to the pressure-relief valve. This closing force is directly proportional to the magnitude of fuel vapor pressure in the filler neck which would be needed to exert an opposing force on the pressure-relief valve sufficient to move the valve against the spring to its filler neck-venting position.

One object of the present invention is to provide a system in a fuel cap for permitting controlled "early" actuation of the pressure-relief valve in response to the filler neck in a cap-removal direction. Early actuation hastens venting of pressurized fuel vapor in the filler neck past the pressure-relief valve to the atmosphere or a fuel vapor treatment site in a controlled manner.

Another object of the present invention is to provide a system in a fuel cap for automatically reducing the magnitude of the spring force biasing the pressure-relief valve to its filler neck-closing position during removal of the fuel cap from the filler neck. Reduction in the closure force on the pressure-relief valve facilitates venting of pressurized fuel vapor acting upon the pressure-relief valve in the filler neck past the valve in a controlled manner.

According to the present invention, a fuel cap is provided for closing the filler neck of a fuel tank. The cap includes a housing, a handle for rotating the housing relative to the filler neck, first sealing means on the housing for sealingly engaging the filler neck upon rotation of the housing in a first direction, and second sealing means within the housing for controlling fuel vapor within the fuel tank. The housing includes means for rotatably engaging the filler neck and an inner surface defining a venting aperture and providing a valve seat surrounding the venting aperture. The second sealing means includes a pressure-relief valve movable against the valve seat to close the venting aperture.

Actuation means is also included in the fuel cap for providing an operative connection between the handle and the pressure-relief valve. The actuation means includes bias means for applying a closure-inducing force urging the pressure-relief valve against the valve seat to close the vent aperture, and control means for regulating the magnitude of the closure-inducing force in response to rotation of the handle in a direction opposite said first direction.

Use of the control means to lower the magnitude of the closure-inducing force permits the pressure-relief valve to move away from the valve seat to a venting position upon exposure to excessive fuel vapor pressure in the filler neck so that a fuel vapor-venting outlet through the cap is established during a removal of the fuel cap from the filler neck. The fuel vapor-venting outlet could be coupled either to the atmosphere or a fuel vapor treatment site.

In preferred embodiments, the control means includes a control member coupled to the bias means and drive means for moving the control member relative to the housing to change the magnitude of the closure-inducing force applied by the bias means. The drive means includes a drive hub coupled to the handle for rotation therewith and cam means for interconnecting the drive hub and the control member. The cam means urges the control member away from the pressure-relief means in response to rotation of the drive hub in said opposite direction to reduce the magnitude of the closure-inducing force applied by the bias means.

The bias means preferably includes an auxiliary valve, a first spring acting between the pressure-relief valve and the auxiliary valve, and a second spring acting between the auxiliary valve and the control means. The control member is preferably acted upon by the second spring. Further, the control member cooperates with the pressure-relief valve to compress the first and second springs therebetween in response to movement of the control member toward the pressure-relief valve. The drive means moves the control member away from the pressure-relief valve to relax the first and second springs in response to rotation of the handle in said opposite direction, thereby reducing the magnitude of the closure-inducing force applied to the pressure-relief valve by the bias means.

One feature of the present invention is provision in a fuel cap of an operative connection between the handle and the pressure-relief valve which acts to lessen the magnitude of closure force biasing the pressure-relief valve against its seat to a vent-closing position in response to rotation of the handle in a cap-removal direction. Such a reduction of valve-biasing force advantageously permits the pressure-relief valve to move away from its valve seat to a venting position during rotation of the fuel cap on the filler neck to establish a fuel vapor-venting bath past the pressure-relief valve.

A reduction in the amount of closure force applied to the pressure-relief valve causes movement of the pressure-relief valve to its venting position to occur sooner than it would under normal circumstances in which the fuel cap is in a fully tightened position on the filler neck. This early venting system advantageously controls emission of pressurized fuel vapor from the filler neck prior to complete removal of the fuel cap during refueling. Venting past the pressure-relief valve advantageously occurs prior to breaking the primary fuel vapor seal between the fuel cap and the filler neck because of a lost-motion connection provided between the handle and the threaded housing to which the primary seal is mounted.

Another feature of the present invention is that rotation of the handle in the cap-removal direction rotates the drive hub which interconnects with the control member through the cam means to urge the control member in a direction away from the pressure-relief valve. The force exerted on the pressure-relief valve by the spring means, which acts between the control member and the valve, is automatically reduced upon rotation of the handle in the cap-removal direction. One advantage of this feature is that venting of pressurized fuel vapor in the filler neck past the valve is facilitated in a controlled manner.

Advantageously, the cam means can be configured to control the sequence of the actuation of the pressure-relief valve and the disengagement of the housing from the filler neck as a function of the angular movement of the handle relative to the filler neck. Crashworthiness of the fuel cap is improved by imposing a slight delay in actuation of the pressure-relief valve. Furthermore, following the slight delay, the pressurized fuel vapor is released to the atmosphere over a maximized period of time, due, in part, to the subsequent earlier opening of the pressure-relief valve followed by a "lost motion" time delay prior to establishing a driving connection between the handle and the housing. This extra time allows the fuel vapor to be released, diffused, or dissipated in a direction toward the vehicle itself without reaching high fuel vapor concentrations in the vicinity occupied by the user during cap removal in the case of atmosphere discharge.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 3 is an exploded perspective view of a subassembly of the fuel cap showing one technique for assembling a drive hub and closure force-releasing control member; and FIG. 4 is an exploded assembly view in section of a portion of the embodiment illustrated in FIGS. 1 and 2.

DETAILED DESCRIPTION OF THE DRAWINGS

Figure 1:
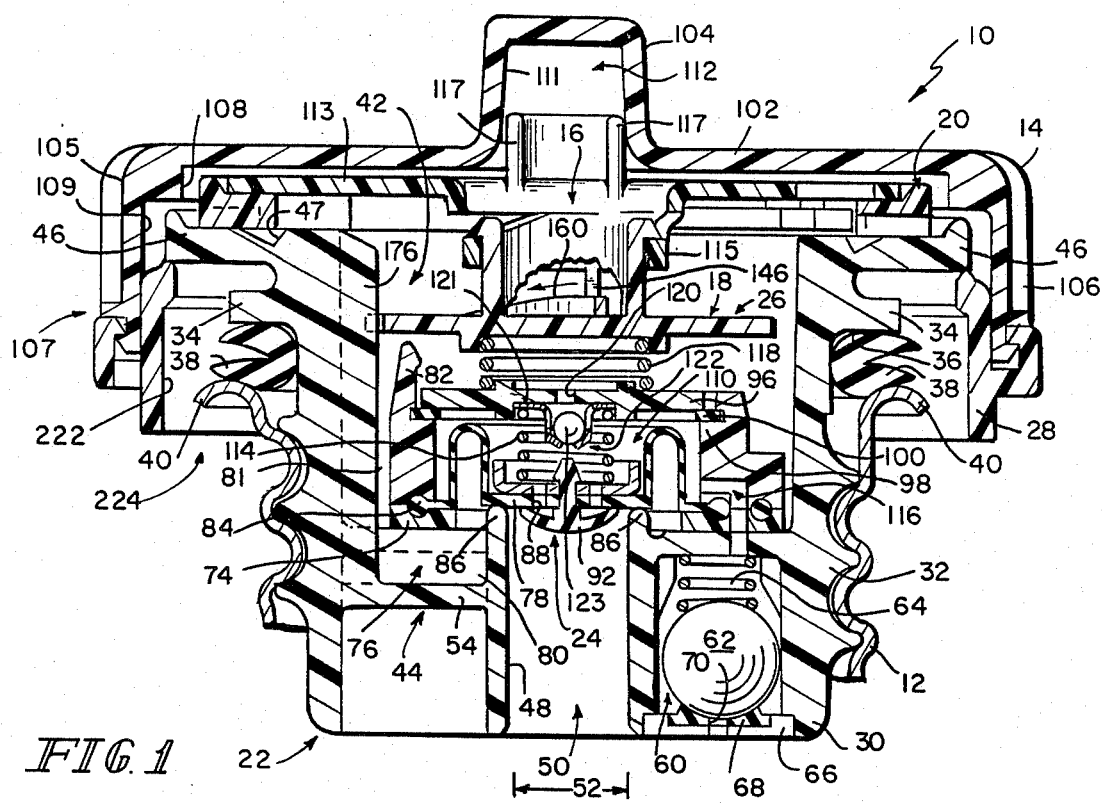
FIG. 1 is a transverse sectional view of the fuel cap of the present invention showing an internal pressure-relief valve in its vent passageway-closing position.
Figure 2:
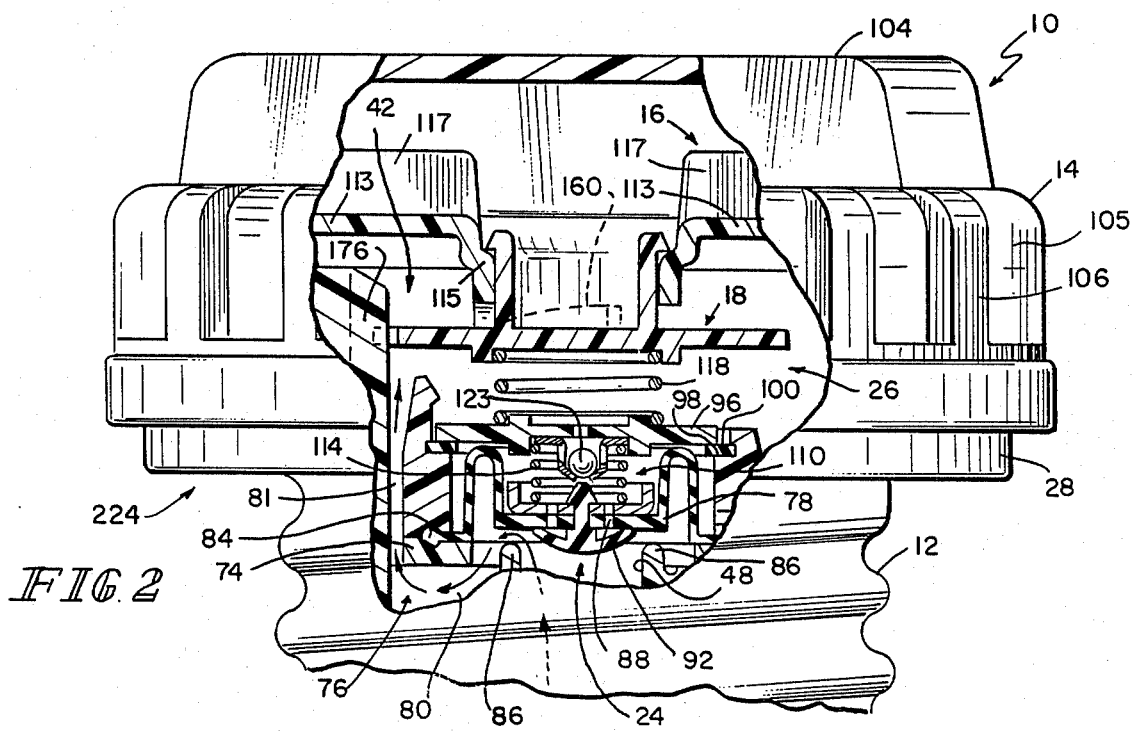
FIG. 2 is a view of the fuel cap illustrated in FIG. 1, with portions broken away to reveal the internal pressure-relief valve in its vent passageway-opening position following rotation of the cap handle relative to the filler neck.

A vented fuel cap 10 for closing a filler neck 12 of a vehicle fuel system (not shown) is illustrated in FIGS. 1 and 2. Fuel cap 10 includes an internal pressure-relief valve movable by spring means to close a vent passageway through the cap 10 and a handle for rotating the cap 10. A novel system is provided for reducing the closing force applied to the internal pressure-relief valve by the spring means upon rotation of the cap handle in a cap-removal direction. This system advantageously permits venting of the filler neck through the vent passageway in the cap 10 to occur in a controlled manner prior to breaking the main filler neck seal.

Referring to FIG. 1, fuel cap 10 includes a shell 14, a drive hub 16, a control member 18, a race 20, a closure 22, a pressure-vacuum valve assembly 24, a valve-biasing assembly 26, and a retainer 28. The closure 22 has an axially inwardly extending shank portion 30 which is threaded as indicated at 32 to engage the threaded filler neck 12.

Radially outwardly extending flange 34 is formed on the axially upper end of closure 22 above threads 32. Flange 34 includes a shoulder 36 for capturing an 0-ring gasket 38 between an upper lip 40 of filler neck 12 and shoulder 36. The gasket 38 cooperates with the shoulder 36 and the upper lip 40 to seal the filler neck 12 so that the fuel and fuel vapor is unable to escape from the fuel tank (not shown) around closure 22 in the space between closure 22 and filler neck 12 as long as the fuel cap 10 is properly mounted on filler neck 12.

Closure 22 further includes a vent passageway 42. The vent passageway 42 is generally cylindrical and is formed by a pressure-vacuum valve housing 44 into which the pressure-vacuum valve assembly 24 is installed. Assembly 24 aids in controlling the flow of fuel vapors through housing 44 and closure 22. Assembly 24 controls venting of pressure and relief of vacuum which develop within the fuel tank while cap 10 is mounted on filler neck 12.

Closure 22 includes a frangible portion 46 on an axially upper portion of shank 30 as shown in FIG. 1. Frangible portion 46 is configured to break away when the shell 14 is exposed to an impact. This breakaway occurs without disrupting the fuel vapor seal provided by gasket 38 between the cap 10 and filler neck 12. The shank 30 is formed to include a groove 47 in its outer surface above sealing flange 34. Frangible portion 46 is cantilevered on the shank 30 in a region radially outwardly beyond groove 47. When shell 14 is subjected to an impact, the frangible portion 46 of shank 30 will fracture along groove 47 causing the entire frangible portion 46 and shell 14 to be severed from fuel cap 10. One advantage of this feature is that the remaining portion of closure 22 including flange 34 will remain intact to seal filler neck 12, thereby reducing the likelihood of gasoline spillage during an accident. Reference is hereby made to U.S. Pat. No. 4,678,097, granted July 7, 1987, to Crute for a description of the use and configuration of groove 47 to provide breakaway features.

Continuing to refer to FIG. 1, the pressure-vacuum valve assembly 24 controls the venting of fuel vapor at a predetermined superatmospheric pressure out of the fuel tank (not shown) through the vent passageway 42 formed by housing 44 and between the closure member 22 and the shell 14 of cap 10 to the atmosphere. The assembly 24 also controls the entry of air through the vent passageway 42 formed by housing 44 into the fuel tank when the pressure in the fuel tank decreases to a predetermined subatmospheric level.

An upstanding cylindrical wall 48 is disposed within the closure 22 to define a vapor discharge orifice 50. The vapor discharge orifice 50 provides fluid communication between the fuel tank (not shown) and the closure 22. The vapor discharge orifice 50 has a diameter indicated by the dimension 52. A support member 54 is provided to position and stabilize the discharge orifice 50 within the closure 22.

A cavity 60 is formed adjacent the discharge orifice 50 between the discharge orifice 50 and a portion of an outer wall of the closure 22. The cavity 60 forms a cylindrical cage which houses a ball 62 that is controlled by a control spring 64. The bottom opening of the cavity 60 is covered by a plate 66 in which a gasket 68 is disposed. The gasket 68 has an opening 70 formed therethrough which forms a valve seat for the ball 62. The control spring 64 is mounted above the ball 62 such that the ball 62 is normally urged axially downwardly to seal the valve seat or opening 70. The opening 70 is the only opening between the fuel tank (not shown) and the interior of the cavity 60. Therefore, with the ball 62 seated on the opening 70, the cavity 60 is placed out of fluid communication with the fuel tank.

A diaphragm seat member 74 is disposed above the support member 54 and includes one or more openings 76. The openings 76 acts to permit fluid communication between an inner space 80 that is disposed radially inwardly from the diaphragm seat member 74 and an outer space 81 that is disposed radially outwardly of the diaphragm seat member 74, between the diaphragm seat member 74 and the wall of the closure 22.

Pressure-relief valve 78 is mounted on the diaphragm seat member 74 and extends across the upper end of the cylindrical wall 48 forming the discharge orifice 50. A bead 84 that extends circumferentially around the pressure-relief valve 78 is captured between the diaphragm seat member 74 and a retainer housing 82 such that the pressure-relief valve 78 is restrained from any radial movement with respect to the diaphragm seat member 74 and retainer housing 82. Because of its configuration and its mounting orientation, the pressure-relief valve 78 is only permitted to move axially toward and away from the upper end of the discharge orifice 50 and specifically toward or away from a valve seat 86 that is formed peripherally around the axially upper end of the cylindrical wall 48.

With the pressure-relief valve 78 seated on the valve seat 86, the discharge orifice 50 is placed out of fluid communication with the inner space 80. When the pressure-relief valve 78 is moved axially upwardly away from the valve seat 86, the discharge orifice 50 is placed in fluid communication with the inner space 80, and, through the opening 76, with the outer space 81. A series of holes 88 is formed in the surface of the pressure-relief valve 78 which are normally covered by an umbrella valve 92. The umbrella valve 92 functions as a vacuum valve and is movable between a closed position where the holes 88 are out of fluid communication with the discharge orifice 50 and an open position where the holes 88 are in fluid communication with the discharge orifice 50. The function of the umbrella valve 92 and the holes 88 will be discussed later.

A venting control valve 96 is disposed above the level of the pressure relief valve 78 and rests on a shoulder 98 that is formed around the inner surface of the retaining housing 82. A gasket 100 is disposed on the shoulder 98 between the shoulder 98 and the venting control valve 96 to form a positive seal between the venting control valve 96 and the shoulder 98. It will be understood that the shoulder 98 forms a valve seat against which the venting control valve 96 normally rests.

The space created above the pressure-relief valve 78 and below the venting control valve 96 and bounded by the inner surface of the retaining housing 82 defines a venting control chamber 110. A spring 114 is disposed within the venting control chamber 110 and functions to bias the pressure relief valve 78 into contact with the valve seat 86. The upper portion of the spring 114 is in contact with the venting control valve 96. Thus, it will be understood that movement of the venting control valve 96 axially upwardly away from the shoulder 98 affects the biasing or "closure" force exerted by the spring 114 on the pressure-relief valve 78. Specifically, axially upward movement of the venting control valve 96 will decrease the biasing force exerted by the spring 114 on the pressure-relief valve 78 toward the valve seat 86. It will be understood that the pressure-relief valve 78 and the spring 114 cooperate to define pressure-relief means that is used to control pressure created by fuel and fuel vapor within the fuel tank (not shown).

A passageway 116 is provided to permit fluid communication between the venting control chamber 110 and the cavity 60. As stated previously, the cavity 60 is selectively placed in fluid communication with the fuel tank (not shown) through the opening or valve seat 70. The fluid communication between the fuel tank and the cavity 60 is controlled by the ball 62 and sprng 64.

A spring 118 is provided above the venting control valve 96 and acts to bias the venting control valve axially downwardly against the shoulder 98 to seal the venting control chamber 110. As can be seen in FIG. 1, the spring 118 is somewhat larger than the spring 114, and exerts a somewhat greater force downwardly against the venting control valve 96 than the force exerted by the spring 114 against the pressure-relief valve 78. The spring 118 is positioned to act between venting control valve 96 and control member 18.

An orifice 120 is formed in the center of the venting control valve 96, with the orifice 120 providing fluid communication between the outer space 81 within the closure member 22 and the venting control chamber 110. One-way valve means 122 is disposed underneath the orifice 120 for permitting fuel vapor and air to flow through the orifice 120, but preventing liquid fuel from flowing through the orifice 120. In particular, one-way valve means 122 includes a cup 121 depending from venting control valve 96 and a ball 123 for selectively closing the orifice 120.

Reference is hereby made to U.S. application Ser. No. 07/062,852, filed June 16, 1987, for a description of a control system within the cap 10 which controls the pressure-relief valve 76 to control venting of fuel vapor from the cap 10 when the cap 10 is in a normal orientation (FIG. 1), and which controls release of fuel vapor and fuel from the cap 10 when the cap 10 is in a substantially inverted orientation (not shown), such as when a vehicle (not shown) carrying the cap is subjected to a roll-over condition. In particular, the above-noted application provides a detailed description of the function and operation of venting control chamber 110 and valves 78, 96, and 62 during normal driving activity and vehicle rollover.

Shell 14, drive hub 16, control member 18, and race 20 cooperate to provide a lost-motion driving connection between the shell 14 and the closure 22. Such an operative connection establishes means for permitting "early" actuation of the pressure-relief valve member 78 in response to rotation of the shell 14 in the cap-removal direction. Such actuation enables the fuel vapor pressure in the filler neck 12 and the fuel tank (not shown) to be normalized prior to removal of the fuel cap from the filler neck 12.

In operation, the closure force exerted on valve member 78 by springs 114 and 118 is lessened by movement of control member 18 away from valve member 78 upon rotation of shell 14 in the cap-removal direction. Such a reduction in closure force contributes to hastening any pressure-induced movement of the pressure-relief valve 78 to its vent passageway-opening position. Movement of pressure-relief valve member 78 away from valve seat 86 under excessive pressure in discharge orifice 50 enables the fuel vapor in the filler neck 12 to be vented without substantially rotating closure 22 relative to filler neck 12 and breaking the seal provided by gasket 38.

Shell 14 provides a hand grip enabling a person to grip and rotate fuel cap 10 manually. Shell 14 includes a top exterior surface 102 configured to provide a raised operating handle 104 and a side wall 105 depending from the peripheral edge of top surface 90. Side wall 105 is formed to include easily gripped, circumferentially spaced ribs 106. Side wall 105 also includes an axially lower, circumferentially extending mounting region 107 for engaging retainer 28. Shell 14 is hollow and includes a first interior wall 108 defining a space for rotatably receiving race 20 and an axially lower second interior wall 109 defining a space for rotatably receiving the axially uppermost flange 46 of closure 22. Handle 104 is also hollow and includes an interior wall 111 defining a recess 112 for receiving a driving portion 117 of the drive hub 16.

Drive hub 16 is best seen in FIGS. 1, 3, and 4, and includes a top disk 113 and a cylindrical skirt 115 of reduced diameter depending from a center portion of top disk 113. Drive hub 16 includes two pair of axially upwardly extending drive blades 117 on top disk 113. Drive blades 117 extend into handle recesses 112 and engage interior wall 111 to provide a driving connection between shell 14 and drive hub 16. Due to this driving connection, drive hub 16 always rotates in response to rotation of shell 14 by a person installing cap 10 on or removing cap 10 from filler neck 12.

Drive hub 16 also includes first and second drive members 124, 126 which depend from a radially outer region of the underside of disk 113, as shown best in FIG. 3, to provide means for applying a rotation-inducing torque to race 20. First drive member 124 includes a drive surface 128 operative during installation of cap 10 on filler neck 12. Second drive member 126 includes a drive surface 130 operative during removal of cap 10 from filler neck 12.

Drive hub 16 further includes a resilient anti-drift finger 132 having a proximal end attached to second drive member 126 as seen best in FIG. 3 and a distal end provided with a pawl tooth 134. Pawl tooth 134 of anti-drift finger 132 loosely engages race 20 to block or otherwise inhibit drifting rotation of drive hub 16 when cap is mounted on filler neck 12, thereby reducing noise, rattle, and wear on components (e.g., control member 18, pressure-vacuum valve assembly 24, etc.) in cap 10 that communicate with drive hub 16.

Skirt 115 of drive hub 16 is connected to control member 18 by means of a camming system which positively moves control memer 18 (1) upwardly toward its pressure relief valve actuation-enhancing position shown in FIG. 2 in response to rotation of drive hub 16 in the cap-removal direction, and (2) downwardly toward its pressure-relief valve actuation-retarding position shown in FIG. 1 in response to rotation of drive hub 16 in the cap-advancing direction. Skirt 115 includes an interior wall 136 and a serially arranged pair of radially inwardly extending, axially upwardly facing cylindrical cam surfaces 138 as shown best in FIG. 3. Each cam surface 138 peripherally extends approximately 180° on the interior wall 136 about the central axis of cylindrical skirt 115.

As shown best in FIGS. 3 and 4, each cam surface 138a,b is divided into a lower flat section 140a,b; an intermediate helical ramp section 142a,b; and an upper flat section 144a,b. Each cam surface 133a,b further includes an axially upwardly extending first stop wall 145. Each first stop wall 145 interconnects the lower flat section 140 of one of cam surfaces 138a,b to the upper flat section 144 of the other of the cam surfaces 138a,b. Skirt 115 further includes a pair of diametrically opposed knife edge cam drivers 146 extending in an axially downward direction from the lowermost rim 148 of skirt 115.

Control member 18 is movable by means of a lost-motion driving connection with the skirt 115 of drive hub 16 between a pressure-relief valve actuation-retarding position illustrated in FIG. 1 and a pressure-relief valve actuation-enhancing position illustrated in FIG. 2. Referring primarily to FIGS. 3 and 4, control member 18 is shown to include a central cam follower 150 and an upstanding coupling member 152 on the top surface of follower 150. Coupling member 152 includes a pair of diametrically opposed, radially outwardly splayed snap prongs 156 for interconnecting the control member 18 and the drive hub 16. Conveniently, each prong 156 includes a head 158 which, in addition to providing coupling means, also functions as a cam follower for riding on one of cylindrical cam surfaces 138a,b.

A pair of arcuate helical ramps 160 are situated in radially outwardly spaced relation from coupling member 152 and extend in an axially upward direction from the top surface of follower 150. Ramps 160 provide inverse cylindrical cams for receiving knife edge cam followers 146 and converting rotational motion of drive hub 16 into upward axial motion of control member 18 toward its pressure-relief valve actuation-enhancing position shown in FIG. 2.

Each ramp 160 includes points of lowest inclination 162 and highest inclination 164 and extends approximately 70° about the central axis of control member 18. A substantially flat lost-motion region 166 is provided on the top surface of follower 150 extending through an angle of approximately 90° between the point of highest inclination of one of the ramps 160 and the point of lowest inclination of the other of the ramps 160 as shown best in the perspective view of FIG. 3. A second stop wall 168 extends axially upwardly from the edge of each lost-motion region 166 to the point of highest inclination 164 of the adjacent ramp 160 as seen in FIG. 3.

Each control member 18 further includes four resilient arcuate rotation-inhibiting fingers 170. Each finger 170 includes an L-shaped proximal end attached to the periphery of follower 150 and a pawl tooth 172 provided at its distal end. Each pawl tooth 172 includes an inclined surface 174 and is positioned to frictionally engage each of the axially extending, radially inwardly projecting ribs 176 circumferentially spaced about the interior wall of closure 22. It will be understood that fingers 170 function to provide frictional drag means which inhibit rotation of control member 18 during the initial stages of rotation of the drive hub 16 in a cap-removal direction. Such frictional drag means facilitates camming conversion of rotational motion of drive hub 16 to axial motion of control member 18.

Annular race 20 is disposed for rotation between drive hub 16 and closure 22 as shown best in FIGS. 1 and 2. In use, race 20 is specially configured to establish a driving connection between shell 14 and closure 22 only after drive hub 16 has already moved control member 18 to enhance early actuation of pressure-relief valve member 78, thereby enabling fuel vapor pressure in the filler neck 12 to be vented through the filler neck mouth during cap removal, and only so long as the torque applied to drive hub 16 via shell 14 does not exceed a predetermined amount. Thus, race 20 acts to delay transmission of a rotation-inducing torque from shell 14 to closure 22 until after filler neck 12 has been vented via aperture 50 normally closed by pressure-relief valve member 78.

Reference is hereby made to U.S. Pat. No. 4,676,390, granted June 30, 1987 to Harris, for a detailed description of a torque-overriding connection of race 20 to closure 22 in the direction which advances closure 22 into filler neck 12 and provision of a direct connection of race 20 to closure 22 in the direction which removes closure 22 from filler neck 12.

Race 20 includes a radially inwardly facing, peripherally extending surface 198 which is provided with a radially inwardly extending driven lug 210 and a radially inwardly extending, rounded, anti-drift lug 212. Lugs 210 and 212 are circumferentially spaced apart in close proximity to one another. Driven lug 210 is relatively larger than anti-drift lug 212 and includes a first driven surface 214 operative during installation of cap 10 on filler neck 12 and an oppositely facing second driven surface (not shown) operative during removal of cap 10 from filler neck 12. Driven lug 210 receives a rotation-inducing drive torque from the one of the first and second drive members 124, 126 of the drive hub 16 during installation and removal of fuel cap 10. Further, anti-drift lug 212 intercepts pawl tooth 134 of anti-drift finger 132 effectively to block drifting rotation of drive hub 16 when cap 10 is mounted on filler neck 12 in the manner described above. Reference is again made to U.S. Pat. No. 4,676,390 for a more complete illustration of the operation of this anti-drift feature.

In its mounted position illustrated in FIGS. 1 and 2, the interior walls (e.g., 108, 109, 111) of shell 14, an axially upper portion of the exterior surface of closure 22, and an interior wall 222 of retainer 28 cooperate, in part, to define outlet deflector means for discharging fuel vapor vented through the pressure-vacuum valve housing 44. The deflected fuel vapor exits cap 10 through annular space 224 defined between the lower peripheral rim of retainer 28 and the outer edge of upper lip 40 of filler neck 12 as shown in FIGS. 1 and 2. Discharged fuel vapor is advantageously diffused as it is vented toward the exterior surface of filler neck 12 in a direction generally away from a person manually operating cap 10 during cap removal for inspection or refueling.

In operation, rotation of shell 14 in the cap-removal direction operates to relax the compression of springs 114 and 118. Such relaxation lessens the magnitude of the closing force applied to pressure-relief valve 78 by springs 114 and 118, thereby facilitating early actuation of the pressure relief valve 78 under excessive pressure in the vapor discharge conduit 50. Such early actuation causes movement of the pressure release valve 78 from its closed position shown in FIG. 1 to its open position shown in FIG. 2 to enable pressurized fuel vapor to be vented from filler neck 12 through the outlet deflector means to the atmosphere. Advantageously, the valve-actuating means 16, 18, and 26 interconnecting shell 14 and valve 78, as well as the closure removal means 16 and 20 interconnecting shell 14 and closure means 22, are configured so that rotation of shell 14 in a cap-removal direction will permit early actuation of valve 78 to enable the filler neck 12 and fuel tank (not shown) to be vented through closure 22 and filler neck mouth 40 without substantially rotating the closure 22 relative to filler neck 12 and breaking the primary seal established by gasket 38.

Although the invention has been described in detail with reference to certain preferred embodiments, variations and modifications exist within the scope and spirit of the inventin as described and defined in the following claims.

What is claimed is:

1. A fuel cap for closing the filler neck of a fuel tank, the cap comprising
   a housing having means for rotatably engaging the filler neck and an inner surface defining a venting aperture and providing a valve seat surrounding the venting aperture,
   first sealing means on the housing for sealingly engaging the filler neck upon rotation of the housing in a first direction,
   second sealing means disposed within the housing for controlling fuel vapor within the fuel tank, the second sealing means including a pressure-relief valve movable against the valve seat to close the vent aperture,
   a handle for rotating the housing relative to the filler neck, and
   actuation means for providing an operative connection between the handle and the pressure-relief valve, the actuation means including bias means for applying a closure-inducing force urging the pressure-relief valve against the valve seat to close the vent aperture and control means for regulating the magnitude of the closure-inducing force in response to rotation of the handle in a direction opposite said first direction so that the pressure-relief valve is permitted to move away from the valve seat to a venting position upon exposure to fuel vapor pressure in the filler neck in excess of a predetermined pressure, thereby establishing a fuel vapor-venting outlet through the fuel cap during removal of the fuel cap from the filler neck.

2. The cap of claim 1; wherein the control means includes a control member coupled to the bias means and drive means for moving the control member relative to the housing to change the magnitude of the closure-inducing force applied by the bias means.

3. The cap of claim 2, wherein the drive means includes a drive hub coupled to the handle for rotation therewith and first cam means interconnecting the drive hub and the control member for urging the control member away from the pressure-relief means in response to rotation of the drive hub in said opposite direction to reduce the magnitude of the closure-inducing force applied by the bias means.

4. The cap of claim 3, wherein the first cam means includes at least one cylindrical cam on the drive hub and at least one upstanding cam follower on the control member in engagement with the at least one cylindrical cam, and the at least one cylindrical cam has an axis of rotation and is configured to impart rectilinear motion to the control member in response to rotation of the at least one cylindrical cam during rotation of the drive hub in said opposite direction so that the direction of control member motion is substantially parallel to the axis of rotation of the at least one cylindrical cam.

5. The cap of claim 3, further comprising second cam means interconnecting the drive hub and the control member for urging the control member toward the pressure-relief means in response to rotation of the drive hub in said first direction to increase the magnitude of the closure-inducing force applied by the bias means.

6. The cap of claim 4, wherein the second means includes at least one cam driver depending from the drive hub and at least one inverse cylindrical cam on the control member in engagement with the at least one cam driver, the at least one inverse cylindrical cam has an axis of rotation and is configured to permit controlled movement of the control member away from the pressure-relief means in response to rotation of the at least one cam driver during rotation of the drive hub in said opposite direction so that the direction of control member motion is substantially parallel to the axis of rotation of the at least one inverse cylindrical cam, and the at least one cam driver acts to impart controlled movement of the control member toward the pressure-relief means in response to rotation of the drive hub in said first direction.

7. The cap of claim 1, wherein the bias means includes at least one spring acting between the control means and the pressure-relief valve.

8. The cap of claim 7, wherein the bias means includes an auxiliary valve, a frrst spring acting between the pressure-relief valve and the auxiliary valve, and a second spring acting between the auxiliary valve and the control means.

9. The cap of claim 8, further comprising a support member situated in the housing intermediate the valve seat and the control means, the support member including means for gripping the pressure-relief valve so that the pressure-relief valve is movable relative to the valve seat and an inner surface defining an auxiliary venting aperture and providing an auxiliary valve seat surrounding the auxiliary venting aperture, the auxiliary valve being movable against the first spring to enqage the auxiliary valve seat and close the auxiliary venting aperture, the control means cooperating with the first spring, the auxiliary valve, the second spring, and the pressure-relief valve to provide primary pressure-relief means for venting pressurized fuel vapor in the filler neck along a first path through the housing and cooperating with the second spring and the auxiliary valve to provide auxiliary pressure-relief means for venting pressurized fuel vapor in the filler neck along a second path through the housing.

10. The cap of claim 8, wherein the control means includes a control member acted upon by the second spring, the control member cooperating with the pressure-relief valve to compress the first and second springs therebetween in response to movement of the control member toward the pressure-relief valve, and drive means interconnecting the handle and the control member for moving the control member away from the pressure-relief valve to relax the first and second springs in response to rotation of the handle in said opposite direction, thereby reducing the magnitude of the closure-inducing force applied by the bias means.

11. A fuel cap for losing the filler neck of a fuel tank, the cap comprising
a housing having means for rotatably engaging the filler neck,
first sealing means on the housing for sealingly engaging the filler neck upon rotation of the housing in a first direction,
second sealing means disposed within the housing for controlling fuel vapor within the fuel tank, the second sealing means including pressure-relief means for venting pressurized fuel vapor in the filler neck through the housing, the pressure-relief means being movable between a filler neck-closing position and a filler neck-venting position,
a handle for rotating the housing relative to the filler neck, and
actuation means providing an operative connection between the handle and the pressure-relief means for permitting movement of the pressure-relief means from its closing position to its opening position in response to rotation of the handle in a direction opposite said first direction so that a movement-inducing force provided by pressure in the filler neck in excess of a predetermined pressure acts upon the pressure-relief means to move the pressure-relief means to its opening position, thereby establishing a fuel vapor-venting outlet through the fuel cap during removal of the cap from the filler neck.

12. The cap of claim 11, wherein the housing includes an inner surface defining a venting aperture and providing a valve seat surrounding the venting aperture, the pressure-relief means includes a pressure-relief valve and spring means exerting a biasing force on the pressure-relief valve for yieldably biasing the pressure-relief valve against the valve seat normally to establish said closing position, and the actuation means includes control means for selectively reducing the biasing force provided by the spring means.

13. The cap of claim 12, wherein the control means includes a drive hub coupled to the handle for rotation therewith, a control member axially movable in the housing between an inactive position and a spring means-releasing position, and camming means interconnecting the drive hub and the control member for urging the control member in an axial direction toward its spring means-releasing position in response to rotation of the drive hub in the cap-removal direction.

14. The cap of claim 13, wherein the actuation means further includes frictional drag means for releasably inhibiting rotation of the control member during axial movement toward its spring means-releasing position.

15. A fuel cap for closing the filler neck of a fuel tank, the cap comprising
closure means for providing a housing rotatably engaging and closing the filler neck,
cover means for rotating the housing relative to the filler neck,
vent path means for providing a controllable normally closed vent path through the closure means, the vent path means including sensor means for sensing pressure in the filler neck, and
actuation means providing an operative connection between the cover means and the vent path means for permitting opening of the vent path means in response to exposure of the sensor means to fuel vapor pressure in the filler neck in excess of a predetermined pressure and to rotation of the cover means relative to the filler neck away from a fully closed position in a cap-removal direction, thereby establishing a fuel vapor-venting outlet path through the fuel cap during removal of the fuel cap from the filler neck.

16. The cap of claim 15, wherein the sensor means includes a pressure-relief valve movable between a vent path-closing and a vent path-opening position and spring means for yieldably biasing the pressure-relief valve toward its vent path-closing position and the actuation means includes a control member coupled to the spring means and drive means for moving the control member relative to the closure means and away from the pressure-relief valve upon rotation of the cover means in the cap-removal direction.

17. The cap of claim 16, wherein the spring means acts between the control member and the pressure-relief valve to apply a closure-inducing force to the pressure-relief valve, the magnitude of the closure-inducing force acting to establish an actuation pressure of the pressure-relief valve upon movement of the control member to a position corresponding to the fully closed position of the cover means, the spring means is configured to provide means responsive to rotation of the cover means in the cap-removal direction for diminishing the magnitude of the closure-inducing force to lower the actuation pressure of the pressure-relief valve below a predetermined pressure so that fuel vapor in the filler neck having a pressure in excess of the predetermined pressure operates to move the pressure-relief valve to its vent path-opening position.

* * * * *

UNITED STATES PATENT AND TRADEMARK OFFICE
CERTIFICATE OF CORRECTION

PATENT NO. : 4,779,755

DATED : October 25, 1988

INVENTOR(S) : Robert S. Harris

It is certified that error appears in the above-identified patent and that said Letters Patent is hereby corrected as shown below:

At column 2, line 24, please delete "oonfigured" and insert therefor --configured--;

At column 7, line 22, please delete "sprng" and insert therefor --spring--;

At column 9, line 10, please delete "133a, b" and insert therefor --138a, b--;

At column 12, line 34, please delete "frrst" and insert therefor --first--;

At column 12, line 46, please delete "enqage" and insert therefor --engage--; and At column 13, line 1, please delete "losing" and insert therefor --closing--.

Signed and Sealed this

Twenty-eighth Day of March, 1989

*Attest:*

DONALD J. QUIGG

*Attesting Officer*  *Commissioner of Patents and Trademarks*